United States Patent Office 3,349,112
Patented Oct. 24, 1967

3,349,112
ALKYL CARBAMATES OF CARBOALKOXY
SALICYLANILIDES
Richard S. P. Hsi, Kalamazoo, Mich., assignor to The
Upjohn Company, Kalamazoo, Mich., a corporation of
Delaware
No Drawing. Filed Jan. 13, 1964, Ser. No. 337,166
4 Claims. (Cl. 260—471)

ABSTRACT OF THE DISCLOSURE

Alkylcarbamates of carboalkoxysalicylic acid of the formula:

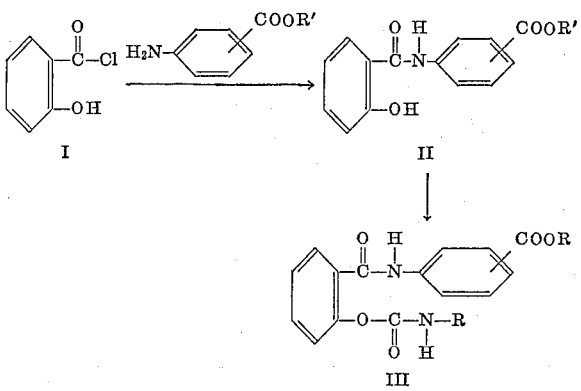

wherein R and R' are lower alkyl radicals, and which have anti-inflammatory and anti-fungal activity, are prepared by: (1) reacting salicyloyl chloride with an aminobenzoic acid ester, and (2) reacting the resulting carboalkoxysalicylanilide with an alkyl isocyanate. The alkylcarbamates of carboalkoxysalicylic acid are useful to treat dermatitis, rheumatoid and traumatic arthritis of mammals and birds, and can also be employed against virus e.g. (Newcastle disease virus).

This invention relates to new and useful chemical compounds and more particularly to new alkylcarbamates of carboalkoxysalicylanilides useful as anti-inflammatory as well as insecticidal agents, and to a process of production thereof.

The novel compounds of the present invention and the process of their production are illustratively represented by the following sequence of formulae:

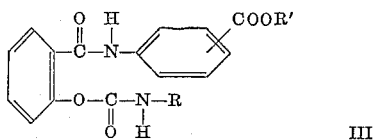

wherein R and R' are lower-alkyl radicals having from 1 to 6 carbon atoms, inclusive.

Representative for radicals R and R' are methyl, ethyl, propyl, isopropyl, butyl, isobutyl, pentyl, isopentyl, hexyl, 2,2-dimethylbutyl, 2,3-dimethylbutyl, 3-methylpentyl and the like groups.

The novel compounds of this invention having Formula III have demonstrated anti-inflammatory activity as shown by the granuloma pouch tests in rats.

These compounds are therefore useful in the preparation of a wide variety of pharamaceutical compositions, particularly in unit dosage form, each unit containing a predetermined amount of the therapeutic compound of the present invention for oral, topical and parenteral administration. For oral administration compositions can be used in the form of tablets, pills, capsules, boluses, feed granules, elixirs, syrups and the like. For topical administration the compounds of Formula III can be used in the form of ointments, creams, lotions, sprays, solutions, suspensions or powders, while for parenteral administration sterile solutions and suspensions can be prepared in vehicles containing water, ethanol, glycerol, polyalkylene glycols, vegetable oils, and the like.

The compositions, in the appropriate form, can be administered oraly and parenterally for systemic treatment, applied topically for local treatment, or administered parenterally for local treatment, such as injection into the joint cavity, tendon sheath and bursa.

The compositions provide the veterinarian with a method for treating inflammations in large and small animals, e.g., mammals, birds and fish. The mammals, birds and fish thus treated can be animals raised commercially for profit as well as animals kept for pets or research. Inflammatory conditions which can be treated include, but are not limited to, enteritis, rheumatoid and traumatic arthritis, osteoarthritis, tenosynovitis, bursitis and the like. Also, dermatitis of various origins can be treated.

The compounds also have insecticidal properties. For application as insecticides the compounds of Formula III are formulated into compositions adapted to insecticidal use.

The compounds of Formula III have further been shown to possess anti-viral (e.g., against Newcastle disease virus), cytotoxic, anti-bacterial (e.g., against *Bacillus subtilis*), and anti-fungal (e.g., against *Trichophyton rubrum*) activities and can be used in suitable formulations against viral, fungal and bacterial infections.

Some of the starting materials, carboalkoxysalicylanilides, are known compounds in the art. Other carboalkoxysalicylanilides can be synthesized by known methods, for example, as shown in the preparations.

In carrying out the process of this invention, alkylcarbamates of the carboalkoxysalicylanilides are obtained by reacting the carboalkoxysalicylanilide in an inert organic solvent with a selected alkyl isocyanate. Inert solvents used in the reaction can be pyridine, diethyl ether, diisopropyl ether, dioxane, tetrahydrofuran, toluene, benzene, or the like. In the preferred embodiment of this invention the reactants are mixed in equimolecular ratio or the alkyl isocyanates are used in slight excess (10 to 50%) above equimolecular proportion. Larger ratios or smaller ratios of starting materials and alkyl isocyanate are operative, but do not provide any advantages. The reaction proceeds at temperatures between about 15 and 100° C. and can be accelerated by adding a small amount of a base such as triethylamine or using a basic solvent such as pyridine. The time of the reaction is between several hours to 1 week or more. At room temperature, usually from 12 hours to 4 days is required for the reaction to proceed to completion. The product is recovered by conventional means, such as filtration or concentration of the reaction mixture followed by filtration and the product is purified by washing and/or recrystallizing.

PREPARATION 1

*Hexyl 4-aminobenzoate*

A mixture was prepared containing 1 mole of p-aminobenzoic acid (4-aminobenzoic acid) in 5 moles of hexyl alcohol. This mixture was heated to reflux and thereupon dry hydrogen chloride gas was permitted to pass through the mixture for a period of about 10 hours. The mixture was thereupon distilled under reduced pressure to remove the excess of hexyl alcohol. Thereafter, to the residual hexyl 4-aminobenzoate hydrochloride were added 250 ml. of water and sufficient 10% sodium hydroxide solution to render basic the aqueous mixture. This mixture was then extracted 4 times with methylene chloride, the methylene chloride extracts washed repeatedly with water, dried over anhydrous sodium sulfate, and evaporated to give a residue which was used as is without further purification in subsequent reactions.

In the same manner given in this preparation, other esters of aminobenzoic acids can be prepared by reacting a selected aminobenzoic acid and an alkanol having from 1 to 6 carbon atoms, inclusive, at reflux temperature in the presence of hydrogen chloride gas. Representative esters of aminobenzoic acids thus prepared include the isopropyl, isobutyl, pentyl, 1-methylbutyl, 2,2-dimethylbutyl, 2,3-dimethylbutyl, and 3-methylpentyl, 2-, 3-, and 4-aminobenzoates.

PREPARATION 2

2'-carbomethoxysalicylanilide

A solution containing 38 g. (0.25 mole) of salicyloyl chloride in 50 ml. of dry tetrahydrofuran was added dropwise with stirring to a solution containing 91 g. (0.60 mole) of methyl anthranilate in 300 ml. of the same solvent. The solidified mixture was kept at room temperature overnight and then broken up by the addition of 500 ml. of water. The tetrahydrofuran was removed at reduced pressure and the water-insoluble material was filtered and washed with Skellysolve B hexanes. The thus-obtained crude, washed product was recrystallized from a mixture of 200 ml. of benzene and 200 ml. of Skellysolve B hexanes to give 57.5 g. (85.1%) of 2'-carbomethoxysalicylanilide of melting point 132–133° C.

*Analysis.*—Calcd. for $C_{15}H_{13}NO_4$: C, 66.41; H, 4.83; N, 5.16. Found: C, 65.85; H, 5.13; N, 5.11.

PREPARATION 3

2'-carboethoxysalicylanilide

In the same manner given in Preparation 2, salicyloyl chloride in tetrahydrofuran was reacted with a solution of ethyl anthranilate to give 2'-carboethoxysalicylanilide of melting point 120–121° C.

PREPARATION 4

2'-carbobutoxysalicylanilide

In the same manner given in Preparation 2, salicyloyl chloride in dry tetrahydrofuran was reacted with a solution of butyl anthranilate in the same solvent to give 2'-carbobutoxysalicylanilide.

PREPARATION 5

2'carbohexyloxysalicylanilide

In the same manner given in Preparation 2, salicyloyl chloride was reacted with hexyl anthranilate in tetrahydrofuran solution to give 2'-carbohexyloxysalicylanilide

PREPARATION 6

4'-carboethoxysalicylanilide

A solution containing 19 g. (0.12 mole) of salicyloyl chloride in 20 ml. of dry tetrahydrofuran was added dropwise with stirring to a solution containing 41.35 g. (0.25 mole) of ethyl 4-aminobenzoate in 80 ml. of the same solvent. The mixture was kept at room temperature overnight (about 18 hours). The solvent was removed at reduced pressure and the residue was stirred with 500 ml. of water. The water-insoluble material was collected on a filter and recrystallized from 450 ml. of benzene to give 24.8 g. (72.5%) of 4'-carboethoxysalicylanilide of melting point 156–157° C. and having the following analysis.

*Analysis.*—Calcd. for $C_{16}H_{15}NO_4$: C, 67.36; H, 5.30; N, 4.91. Found: C, 67.63; H, 5.16; N, 5.11.

PREPARATION 7

4'-carbomethoxysalicylanilide

In the same manner given in Preparation 6, salicyloyl chloride and methyl 4-aminobenzoate were reacted at room temperature in dry tetrahydrofuran to give 4'-carbomethoxysalicylanilide.

PREPARATION 8

4'-carbopropoxysalicylanilide

In the same manner given in Preparation 6, salicyloyl chloride and propyl 4-aminobenzoate were reacted in tetrahydrofuran to give 4'-carbopropoxysalicylanilide.

PREPARATION 9

4'-carbopentyloxysalicylanilide

In the manner given in Preparation 6, salicyloyl chloride was reacted with pentyl 4-aminobenzoate to give 4'-carbopentyloxysalicylanilide.

PREPARATION 10

4'-carbohexyloxysalicylanilide

In the manner given in Preparation 6, salicyloyl chloride was reacted with hexyl 4-aminobenzoate in tetrahydrofuran to give 4'-carbohexyloxysalicylanilide.

PREPARATION 11

4'-carboisopropoxysalicylanilide

In the manner given in Preparation 6, salicyloyl chloride and isopropyl 4-aminobenzoate were reacted in tetrahydrofuran at room temperature to give 4'-carboisopropoxysalicylanilide.

PREPARATION 12

3'-carbomethoxysalicylanilide

In the manner given in Preparation 2, salicyloyl chloride was reacted with methyl 3-aminobenzoate to give 3'-carbomethoxysalicylanilide.

PREPARATION 13

3'-carboethoxysalicylanilide

In the manner given in Preparation 6, salicyloyl chloride and ethyl 3-aminobenzoate were reacted in dry tetrahydrofuran to give 3'-carboethoxysalicylanilide.

PREPARATION 14

3'-carbopropoxysalicylanilide

In the manner given in Preparation 6, salicyloyl chloride was reacted with propyl 3-aminobenzoate in tetrahydrofuran to give 3'-carbopropoxysalicylanilide.

PREPARATION 15

3'-carboisobutoxysalicylanilide

In the manner given in Preparation 2, salicyloyl chloride was reacted with isobutyl 3-aminobenzoate in tetrahydrofuran solution to give 3'-carboisobutoxysalicylanilide.

PREPARATION 16

3'-carbohexyloxysalicylanilide

In the manner given in Preparation 6, salicyloyl chloride was reacted with hexyl 3-aminobenzoate to give 3'-carbohexyloxysalicylanilide.

EXAMPLE 1

Methylcarbamate of 2'-carbomethoxysalicylanilide

A mixture of 8.14 g. (0.03 mole) of 2'-carbomethoxysalicylanilide, 7 ml. of a 50% solution of methyl isocyanate in toluene (0.04 mole of methyl isocyanate), 7 drops of triethylamine and 60 ml. of dry tetrahydrofuran was kept at room temperature overnight (about 18 hours). To this mixture was added 400 ml. of Skellysolve B hexanes. The mixture was then cooled, whereupon 8.65 g. (87.8%) of crystals were obtained which were recrystallized from a mixture of 30 ml. of benzene and 60 ml. of Skellysolve B hexanes to give 8.20 g. of methylcarbamate of 2'-carbomethoxysalicylanilide of melting point 140–142° C. and having the following analysis.

Analysis.—Calcd. for $C_{17}H_{16}N_2O_5$: C, 62.19; H, 4.91; N, 8.53. Found: C, 62.62; H, 5.16; N, 8.19.

EXAMPLE 2

*Ethylcarbamate of 2'-carboethoxysalicylanilide*

In the manner given in Example 1, ethyl isocyanate, triethylamine, and 2'-carboethoxysalicylanilide were reacted in tetrahydrofuran solution to give ethylcarbamate of 2'-carboethoxysalicylanilide.

EXAMPLE 3

*Butylcarbamate of 2'-carbomethoxysalicylanilide*

In the manner given in Example 1, butyl isocyanate, triethylamine, and 2'-carbomethoxysalicylanilide in tetrahydrofuran solution were reacted at room temperature to give butylcarbamate of 2'-carbomethoxysalicylanilide.

EXAMPLE 4

*Hexylcarbamate of 2'-carboethoxysalicylanilide*

In the manner given in Example 1, hexyl isocyanate was reacted with 2'-carboethoxysalicylanilide in the presence of triethylamine to give hexylcarbamate of 2'-carboethoxysalicylanilide.

EXAMPLE 5

*Methylcarbamate of 4'-carboethoxysalicylanilide*

A mixture of 4'-carboethoxysalicylanilide (14.26 g., 0.05 mole), 11 ml. of methyl isocyanate solution in toluene (51% solution, 0.066 mole of methyl isocyanate), 6 drops of triethylamine and 50 ml. of dry tetrahydrofuran was kept at room temperature overnight. The solidified mixture was diluted with 150 ml. of absolute ether, filtered and the crystals were washed with ether to give 16.8 g. (98.2%) of methylcarbamate of 4'-carboethoxysalicylanilide of melting point 168.5–170° C. and having the following analysis.

Analysis.—Calcd. for $C_{18}H_{18}N_2O_5$: C, 63.15; H, 5.30; N, 8.18. Found: C, 63.56; H, 5.34; N, 8.13.

EXAMPLE 6

*Pentylcarbamate of 4'-carboethoxysalicylanilide*

In the manner given in Example 1, pentyl isocyanate and 4'-carboethoxysalicylanilide were reacted in the presence of triethylamine in tetrahydrofuran solution to give pentylcarbamate of 4'-carboethoxysalicylanilide.

EXAMPLE 7

*Methylcarbamate of 4'-carbobutoxysalicylanilide*

In the manner given in Example 1, methyl isocyanate was reacted in tetrahydrofuran solution with 4'-carbobutoxysalicylanilide in the presence of triethylamine to give methylcarbamate of 4'-carbobutoxysalicylanilide.

EXAMPLE 8

*Methylcarbamate of 3'carbomethoxysalicylanilide*

In the manner given in Example 1, methyl isocyanate was reacted with 3'-carbomethoxysalicylanilide in tetrahydrofuran solution in the presence of triethylamine to give methylcarbamate of 3'-carbomethoxysalicylanilide.

EXAMPLE 9

*Hexylcarbamate of 3'-carboisobutoxysalicylanilide*

In the manner given in Example 1, 3'-carboisobutoxysalicylanilide was reacted with hexyl isocyanate in the presence of triethylamine in tetrahydrofuran solution to give hexylcarbamate of 3'-carboisobutoxysalicylanilide.

In the same manner given in Example 1, other alkylcarbamates of carboalkoxysalicylanilides can be made by reacting a selected alkyl isocyanate with a selected carboalkoxysalicylanilide in tetrahydrofuran in the presence of a base such as triethylamine, tripropylamine, or the like. Representative compounds thus produced include, for example, the propylcarbamate, isopropylcarbamate, butylcarbamate, isobutylcarbamate, pentylcarbamate, isopentylcarbamate, hexylcarbamate, 2,2-dimethylbutylcarbamate, 2,3-dimethylbutylcarbamate, 3-methylpentylcarbamate, and the like of 2'-carbopropoxysalicylanilide, 2'-carboisopropoxysalicylanilide, 2' - carbobutoxysalicylanilide, 2'-carbopentyloxysalicylanilide, and 2'-carboisohexyl oxysalicylanilide; 2,2-dimethlbutylcarbamate of 3'-carbomethoxysalicylanilide; isopropylcarbamate of 3'-carbobutoxysalicylanilide; isobutylcarbamate of 4'-carbopropoxysalicylanilide; isobutylcarbamate of 4'-carboisobutoxysalicylanilide, and the like.

I claim:
1. An alkylcarbamate of a carboalkoxysalicylanilide having the formula:

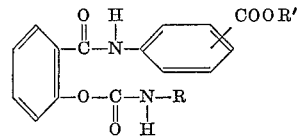

wherein R and R' are lower-alkyl radicals having from 1 to 6 carbon atoms, inclusive.
2. Methylcarbamate of 2'-carbomethoxysalicylanilide.
3. Methylcarbamate of 2'-carboethoxysalicylanilide.
4. Methylcarbamate of 4'-carboethoxysalicylanilide.

References Cited

UNITED STATES PATENTS 2,945,877   7/1960   Zima et al. _____ 260—471

OTHER REFERENCES

Advanced Organic Chemistry, E. E. Royals, (1956), Prentice Hall, Inc. pp. 609 and 617 relied on.

RICHARD K. JACKSON, *Primary Examiner.*

L. THAXTON, *Assistant Examiner.*

UNITED STATES PATENT OFFICE
CERTIFICATE OF CORRECTION

Patent No. 3,349,112                                October 24, 1967

Richard S. P. Hsi

It is hereby certified that error appears in the above numbered patent requiring correction and that the said Letters Patent should read as corrected below.

Column 1, lines 17 to 31, Formulas I, II, and III should be deleted and replaced by Formula III appearing in lines 52 to 56, same column 1; formula III appearing in lines 52 to 56, column 1, should be deleted and replaced by formulas I, II, and III appearing in lines 17 to 31, column 1.

Signed and sealed this 4th day of March 1969.

(SEAL)
Attest:

Edward M. Fletcher, Jr.                                EDWARD J. BRENNER
Attesting Officer                                         Commissioner of Patents